US008134089B2

(12) United States Patent
Roseen et al.

(10) Patent No.: US 8,134,089 B2
(45) Date of Patent: Mar. 13, 2012

(54) DEVICE FOR ELECTRIC CONNECTION, A METHOD FOR PRODUCING SUCH A DEVICE, AND AN ELECTRIC POWER INSTALLATION PROVIDED THEREWITH

(75) Inventors: Patrik Roseen, Västerås (SE); Paal Kristian Skryten, Skien (NO); Tom-Rune Bjortuft, Porsgrunn (NO); Ole Granhaug, Skien (NO); Robert Espeseth, Skien (NO)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/758,520

(22) Filed: Apr. 12, 2010

(65) Prior Publication Data

US 2010/0258347 A1 Oct. 14, 2010

Related U.S. Application Data

(63) Continuation of application No. PCT/EP2008/063698, filed on Oct. 13, 2008.

(30) Foreign Application Priority Data

Oct. 12, 2007 (EP) .................................... 07020050

(51) Int. Cl.
*H02G 3/18* (2006.01)
*H02G 3/22* (2006.01)

(52) U.S. Cl. .... 174/668; 174/667; 174/650; 174/153 G; 439/625; 16/2.2

(58) Field of Classification Search .................. 174/650, 174/668, 667, 652, 68.1, 135, 153 G, 151, 174/17 CT, 17 R; 439/625, 198, 607.01, 439/620.29, 736; 28/887; 361/670.01, 600, 361/601; 16/2.1, 2.2; 248/56
See application file for complete search history.

(56) References Cited

U.S. PATENT DOCUMENTS 3,829,810 A 8/1974 Giegerich
(Continued)

FOREIGN PATENT DOCUMENTS

| | | | |
|---|---|---|---|
| DE | 102005059754 | A1 | 6/2007 |
| EP | 0354494 | A1 | 2/1990 |
| GB | 1097828 | | 1/1968 |

OTHER PUBLICATIONS

European Search Report; EP 07 02 0050; Feb. 20, 2008; 3 pages.

(Continued)

*Primary Examiner* — Angel R Estrada
(74) *Attorney, Agent, or Firm* — St. Onge Steward Johnston & Reens LLC

(57) ABSTRACT

A device for electric connection to an energy supply conductor for medium and high voltage, including: a voltage-carrying element; a tubular outer shell formed by a thermoplastic polymer and connected to the voltage carrying element; wherein the voltage-carrying element extends in a longitudinal direction of the tubular shell, and wherein, at least along a part of the length of the voltage-carrying element, the outer shell extends in a longitudinal direction with a space between its inner periphery and an outer periphery of the voltage-carrying element; the outer shell being provided with an outer contact surface to be connected to a wall of a gas-tight container somewhere along the part of the length of the voltage-carrying element; wherein the outer shell is arranged so as to separate said space from an atmosphere outside a container to which the device may be connected. At least along a section of the part of the length of the voltage-carrying element the space is filled with a filler of an electrically insulating material other than that of the outer shell, the filler completely filling the space along the section.

22 Claims, 3 Drawing Sheets

U.S. PATENT DOCUMENTS

| | | | | |
|---|---|---|---|---|
| 4,703,234 | A * | 10/1987 | Kato | 174/17 CT |
| 5,531,459 | A * | 7/1996 | Fukuda et al. | 174/153 G |
| 6,225,562 | B1 * | 5/2001 | Fujishita et al. | 174/152 G |
| 6,297,457 | B1 * | 10/2001 | Yamada et al. | 174/152 G |
| 6,402,155 | B2 * | 6/2002 | Sakata | 174/153 G |
| 6,995,316 | B1 * | 2/2006 | Goto | 174/659 |
| 7,825,331 | B2 * | 11/2010 | Allais et al. | 174/152 R |

OTHER PUBLICATIONS

International Preliminary Report on Patentability; PCT/EP2008/063698; Jan. 14, 2010; 10 pages.

International Search Report and Written Opinion of the International Searching Authority; PCT/EP2008/063698; Mar. 24, 2009; 13 pages.

* cited by examiner

DEVICE FOR ELECTRIC CONNECTION, A METHOD FOR PRODUCING SUCH A DEVICE, AND AN ELECTRIC POWER INSTALLATION PROVIDED THEREWITH

CROSS-REFERENCE TO RELATED APPLICATIONS

The present application is a continuation of pending International patent application PCT/EP2008/063698 filed on Oct. 13, 2008 which designates the United States and claims priority from European patent application 07020050.6 filed on Oct. 12, 2007, the content of which is incorporated herein by reference.

FIELD OF THE INVENTION

The present invention relates to a device for electric connection to an energy supply conductor for medium and high voltage, comprising: a voltage-carrying element; a tubular outer shell formed by a thermoplastic polymer and connected to the voltage carrying element; wherein the voltage-carrying element extends in a longitudinal direction of said tubular shell, and wherein, at least along a part of the length of the voltage-carrying element, the outer shell extends in said longitudinal direction with a space between its inner periphery and an outer periphery of the voltage-carrying element; said outer shell being provided with an outer contact surface to be connected to a wall of a container somewhere along said part of the length of the voltage-carrying element; and wherein said outer shell is arranged so as to separate said space from an atmosphere outside a container to which said device may be connected.

The invention also relates to a method of producing a device according to the invention, as well as electric power installation comprising a container with a wall connected to ground, said installation comprising a device according the invention protruding through and physically connected to said wall. It is preferred, but not necessary, that the inventive device is a bushing used for connecting a cable to any further electric power equipment, or a canister in which a fuse is inserted from outside a container in which electric power equipment may be housed. The container through the wall of which a device according to the invention is to protrude may house electric power equipment such as electric switchgears, breakers, transformers, etc. Medium or high voltage is referred to as voltages of 1 kV and above.

BACKGROUND OF THE INVENTION

Traditionally, electric power bushings have been made of an electric insulating part formed by a thermosetting resin such as epoxy moulded around an electric conductor. The task of the insulation has been to prevent electric discharges form upcoming between the conductor and the wait of a container through which the bushing protrudes. The thermosetting resin has been provided with a sufficiently high thickness to provide a satisfying functionality in this respect. However, moulding of thick, solid bodies of a thermosetting element is a costly process, and alternatives have been sought for.

Lately it has been suggested, for example in DE 102005059754, to let the bushing comprise a tubular body made of a thermoplastic resin that, in one thereof, is connected to the conductor and presents a thin-walled outer shell that is to be connected to the wall of a gas-tight container. There is an empty space between the conductor and the outer shell of the tubular body, and this empty space is in communication with the interior of the gas-tight container, which is suggested to be filled with an electrically insulating gas such as SF6. The use of thin-walled bushings of this type results in lower production costs in comparison to the use of thermosetting bushings of prior art.

However, for unusual situations, the use of an insulating gas alone might be insufficient in order to achieve a guaranteed prevention of electric discharges emanating from the conductor. Should there be any leakage of the insulating gas from the container, a device like the one suggested in DE 102005059754 is also very sensitive and likely to be subjected to electric discharges. Bushings of the kind lately suggested, using thin-walled insulation formed by a thermoplastic resin, will thus need to be re-designed in order to prevent the upcoming of electric discharges between the conductor of the bushing and the container wall. A disadvantage of thin walls of thermoplastic polymers might also be that they may be subjected to diffusion of moisture from the atmosphere into the container to which the bushing is connected.

The applicant has also realised that the same kind of design (thin-walled thermoplastic insulation instead of thick-walled thermosetting resin insulation) used for bushings may also be used for fuse canisters arranged so as protrude the walls of containers of electric power installations. Such canisters comprise an electric shield extending generally in the longitudinal direction of the canister and crosswise to the wall of the container, thereby intersecting the extension plane of the latter, wherein said shield is provided for the purpose of suppressing an electric field inside the canister and is carrying the same voltage as a conductor to which a fuse inserted into the canister is to be connected. Accordingly, the present invention is also applicable to this kind of devices.

It is an object of the invention to present a device as initially defined that remedies the above-mentioned drawbacks of prior art.

SUMMARY OF THE INVENTION

The object of the invention is achieved by means of the initially defined device, characterised in that, along at least a section of said part of the length of the voltage carrying element said space is filled with a filler of an electrically insulating material other than that of the outer shell, said filler completely filling said space along said section. In other words, the filler fills the whole cross section of said space, as seen in the longitudinal direction of the tubular outer shell, along said section. It is of utmost importance that there be no discharge-promoting air pockets left inside the filler or between the filler and the inner periphery of the outer shell or outer periphery of the voltage-carrying element in the region of the filler since, in such a case, the electric field will be extremely concentrated to such pockets, and therefore there would be an obvious risk of having an partial discharge emanating from such a pocket. The filler should be provided in said space in that region or those regions in which the electric field concentration will be at its highest during operation of the device (when under operational conditions a medium or high voltage is applied to the voltage-carrying element). The contact surface defined herein is a surface against which a grounded wall of a container is to be connected, either directly or via any other element. Accordingly the contact surface in question is located somewhere on the outer shell, and any grounded wall connected thereto will extend in a direction crosswise to the longitudinal direction of said tubular shell. Preferably, the outer shell comprises a radial flange, preferably made of the same material as the rest of the shell, to which the wall of a container is to be connected. The position of the flange therefore generally corresponds to the position of said contact surface and also the intersection plane of a wall through which the device according to the invention is to protrude. In other words, the section along which the filler is provided intersects the extension plane of a wall that the tubular outer shell protrudes through when in operation.

According to a preferred embodiment it is preferred that in the longitudinal direction of said tubular outer shell, said filler fills said space from a first end region of said space to the region of said contact surface, i.e. the region in which the extension plane of a grounded container wall will intersect the space in question when the device is mounted such that it protrudes said wall. It is preferred that the outer shell protrudes through a wall and that the first end region is the region in which the outer shell is connected to the voltage carrying element. The space between the voltage-carrying element and the outer shell extends from said end region towards and beyond the region in which the extension plane of said wall intersects the outer shell, said space and the voltage-carrying element. Therefore, it is highly likely that a very dense electric field will exist in said space from said end region to and beyond said intersection region. Accordingly, a provision of the filler in said end region will reduce the risk of having electric discharges emanating from that or those regions during operational conditions.

It is preferred that, in the longitudinal direction of said tubular outer shell, said filler fills said space from the region of said contact surface to a second end region of said space. The second end of the outer shell that is opposite to said first end region in which it is connected to the voltage-carrying element may be adjacent to the intersection region mentioned above, i.e. the region of said contact surface. Accordingly, the presence of said filler up to that point will improve the electrical stability of the device.

According to a preferred embodiment, said filler has a higher electrical insulating capacity than air, preferably higher than SF6. Thereby, the filler will inhibit electrical discharges if there is a pressure drop of the SF6 in a container to which it is connected. If all SF6 Leaks out, the filler will still be better than having an air-filled space between the voltage-carrying element and the outer shell. Generally, the filler has a higher electrical insulating capacity than the insulating gas mixture in the container to which the outer shell is connected, whatever that gas mixture would be.

According to a further embodiment, said filler is in a solid state. Thereby, it may contribute to the mechanical strength and rigidity of the device and to a firm holding in place of the voltage-carrying element. However, this does not require that the filler must be in direct contact with the voltage-carrying element, even though that may be the case, as will be seen later.

According to a further embodiment, said filler comprises a material moulded and permitted to solidify in said space. Thereby, the filling of said space or volume becomes easier and more accurate (no voids left, also complicated geometric shapes can be filled).

According to a preferred embodiment said filler comprises an elastomer, said elastomer preferably comprising polyurethane as a main constituent.

According to an alternative embodiment, said filler comprises a gel. Recent research and development has resulted in gels that provide both a high thermal conductivity (which is of advantage in these applications) and a high electric insulation capacity. and may be provided in said space as an alternative to other materials. A gel might be able to completely fill spaces the geometries of which are complicated, and it will be able to adopt changes of the geometries of said space or space during use of the inventive device. Such changes may be the result of, for example, thermal expansion of any element in or around said device. The gel may, preferably, be mixed with or contain particles of a ceramic of higher thermal conductivity than the polymer of the gel itself, for example Boron Nitride particles, for the purpose of improving the thermal conductivity thereof. It may also be mixed with or contain compressible micro-particles, formed by gas-enclosing shells of a polymer in a micro size. In order to make the gel stay in place in said space there may be provided some kind of enclosing structure delimiting the space in which the gel is located. A gel should, preferably, completely fill such a delimited volume, and upon volumetric change of said volume, for example due to thermal expansion of any component therein, the compressible micro-particles will prevent the gel from generating an over pressure in said volume. According to a preferred embodiment said gel is a silicone gel.

According to an alternative embodiment, said space is a sealed space and said filler is in a liquid state. According to one embodiment, said filler comprises oil. The space may be sealed by a wall that connects the outer shell with the voltage carrying element or any element provided on the surface of the voltage-carrying element. Such a wall may be an integrated part of the outer shell or be a separate element attached to the outer shell and to the voltage-carrying part or element connected thereto. A liquid filler like oil will have the advantage of being able to fully fill any space, even those of complicated geometric shape, and will be able of transmitting heat better than most solid materials.

According to a preferred embodiment the device comprises a bushing, wherein the voltage-carrying element thereof is a conductor extending through said bushing in the longitudinal direction, of said outer shell. Preferably, the conductor is provided so as to be connected to a cable outside the space defined between the conductor and the outer shell, and also outside a container the wall of which the bushing protrudes. Preferably—the tubular outer shell defines a truncated cone narrowing towards said end region in which the outer shell is connected to the conductor. It should be understood that the outer shell preferably, but not necessarily, is directly connected to i.e. in direct contact with, the conductor in said end region. However, there might be provided an inner sleeve, preferably comprising a thermoplastic resin and preferably the same as that of the outer shell, that encloses the conductor from said end region in the longitudinal direction towards the opposite end of the outer shell.

According to one embodiment said conductor is exposed to and in contact with said filler material. If the filler material is a solid material and if that filler material adheres well to said conductor, a better sealing functionality between filler and conductor may be obtained than if there would be only a sleeve of a thermoplastic material provided around the conductor, as is the case at the end region in which the outer shell is connected to the conductor. Accordingly, if the bushing protrudes a wall of a container in which there is provided a pressurised gas, such as SF6, the filler will improve the sealing between the conductor and insulation and may eliminate the need of specific means, such as an o-ring, provided for the purpose of further sealing between the conductor and the thermoplastic resin forming the outer shell or a sleeve that contacts and encloses the conductor.

Preferably, said conductor has a modified surface for improved adhesion to said filler in the region in which it contacts said filler. This feature is relevant provided that the filler is a solid material, and may contribute to an even better sealing of the inner of the inner space of the bushing from the outer atmosphere. Such a modification of the surface may include the application of any layer of a material of better adherence to the filler than that of the conductor material itself, or a physical modification, for example a roughening thereof, by means of any surface treatment. There may, as a supplement or alternative thereto, also be provided an adhesive agent, such as a glue, in the interface between the filler and the conductor that improves the adhesion of the filler to the conductor. There may also be provided an adhesive, such as glue, in the interface between thermoplastic polymer, e.g. the outer shell or an inner sleeve, and the filler in order to prevent voids from appearing at said interface.

According to one embodiment said device is a fuse canister, and the voltage-carrying part comprises a shield made of an electrically conducting material arranged for the purpose of suppressing an electric field inside the canister. The invention also relates to a method of producing a device according to the invention, characterised in that it comprises the step of filling said space with a filler in a liquid state and permitting the filler to solidify. Said method also comprises further steps such as a previous step during which an insulation comprising the outer shell is moulded, preferably directly onto or in such a way that it completely or partly encloses, i.e. embeds, the voltage-carrying part. Thereby a cup-shaped body is formed, in which the voltage-carrying part extend with said space between its outer periphery and the inner periphery of said outer shell. During moulding of the filler, the cup-shaped body is filled with the filler in a liquid state up to a certain level thereof, preferably to the highest possible level, and subsequently the filler is permitted to solidify therein.

According to an alternative embodiment, in which the filler is to remain in a liquid or semi-liquid state, the method of the invention comprises the step of filling said space with a filler in a liquid state and enclosing said space.

The invention also relates to an electric installation, comprising a container with a wall connected to ground, wherein said electric installation comprises a device according to any the invention protruding through and physically connected to said wall.

Preferably, said wall extends in a plane cross wise to the longitudinal direction of said tubular outer shell of said device and is connected to said contact surface of said outer shell, either directly or via any intermediate element.

According to one embodiment, said container is a gas-tight container in which there is provided an electrically insulating gas or gas mixture. According to one embodiment such a gas comprises SF6. Preferably, the gas is pressurised, i.e. the pressure inside the container is higher than the pressure of the atmosphere surrounding said container.

Further features and advantages of the invention will be defined in the following detailed description and in the accompanying patent claims.

DETAILED DESCRIPTION OF THE INVENTION

Figure 1:
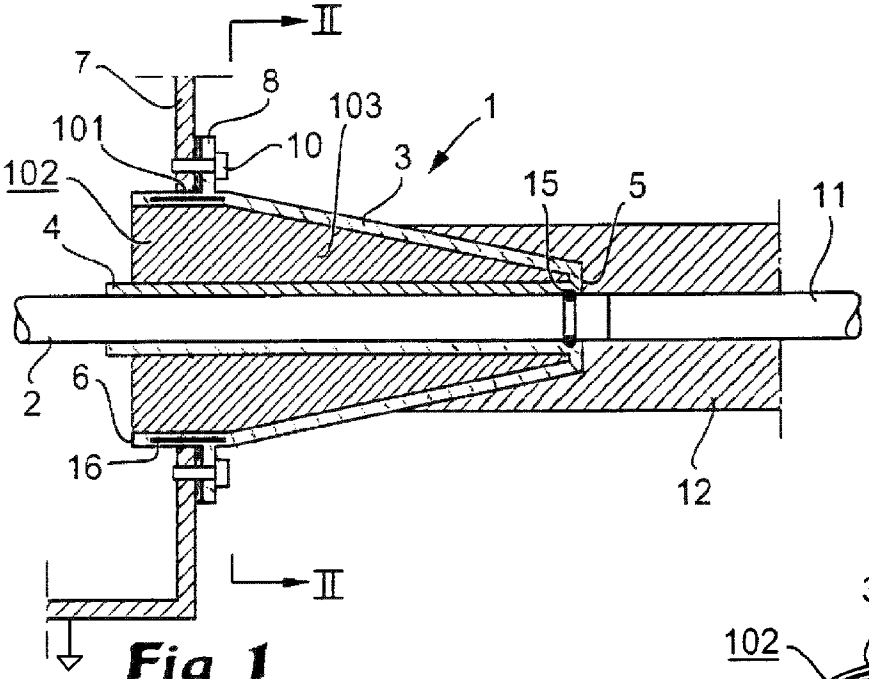
FIG. 1 is a cross section of a first embodiment of a device according to the invention.

FIG. 1 shows a first embodiment of a device according to the invention. The device is a bushing for electric connection to an energy supply conductor such as a cable for medium and high voltage, and is provided so as to protrude and be mounted to a wall of a container, wherein said wall is grounded.

The bushing comprises an electrically insulating part 1 and a voltage-carrying element 2. The insulating part 1 defines a bushing insulator, or wall tube insulator. The voltage-carrying element 2 is elongated and has the shape of a rod. The voltage-carrying element 2 is a conductor, provided so as to conduct a current from the insulating part 1 comprises an outer shell 3 and an inner sleeve 4. The sleeve 4 is tightly enclosing the voltage-carrying element 2 along a length thereof. The insulating part 1 mainly comprises a thermoplastic, such as a partly crystalline or partially aromatic poly amide or any other suitable thermoplastic. Preferably, the device is produced by means of a moulding process, by which the insulating part 1 is moulded in one single moulding step into one single piece, preferably onto the voltage-carrying element 2.

The outer shell 3 defines a tubular element shaped as a truncated cone, which in its narrow end region 5 is connected to the sleeve 4, which in its turn is connected to the voltage-carrying element 2. In other words, the outer shell 3 is connected to the voltage-carrying element 2 in an end region of said outer shell 3. On its outer periphery, in the region of its wide end 6, the outer shell 3 is provided with a means for the connection thereof to a surrounding frame 7. Here the frame 7 is formed by a wall element of a container of an electric power installation, here the vertical wall of an electric connection station. The frame or wall element 7 is connected to earth. In this embodiment, the connection means comprises a flange 8 provided with a number of through holes 9 through which bolts 10 are secured into the frame 7. Said flange 8 presents a contact surface 101 against which the frame or wall element 7 is to bear. The electrically insulating part 1 is supposed to electrically insulate the voltage-carrying element 2 from the frame 7, thereby preventing any short circuit or electrical discharges between the voltage-carrying element 2 and the frame 7. Therefore, either the outer shell 3 or the inner sleeve 4, or both of them, should preferably extend beyond the region of the frame 7 as seen in the longitudinal direction of the outer shell 3 from the end region in which it is connected to the voltage-element 2 to its opposite end. Said longitudinal direction is crosswise to the plane of the adjacent frame or wall 7. When the device is mounted in the frame 7, the voltage-carrying element 2 protrudes through an opening in the frame or wall element 7 to be connected to a cable outside the inner spacing enclosed by the frame 7 and the inventive device itself.

From the region 5 in which the outer shell 3 is connected to the voltage-carrying element 2, the outer shell extends in its longitudinal direction with a spacing between its inner periphery and the outer periphery of the voltage carrying element 2 and the sleeve 4 provided on the latter. Accordingly, there is a space 102 between the outer shell 3 and the voltage-carrying element 2 from said end region 5 towards the opposite end of the outer shell 3. In the embodiment shown in FIG. 1 this space is filled with a solid filler 103 made of an electrically insulating material other than the material of the outer shell 3. The filler 103 preferably comprises an elastomer such as a moulded polyurethane. The filler 103 completely fills the space between the sleeve 4 and the outer shell 3, leaving no air pockets or voids. As an alternative to the suggested material a relatively stiff gel might be used as the filler 103.

Figure 2:
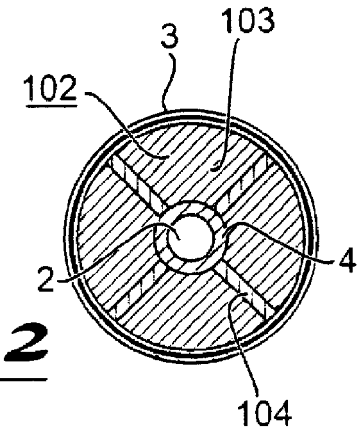
FIG. 2 is a cross-section according to II-II in FIG. 1.

As shown in FIG. 2 the bushing shown in FIG. 1 also comprises a plurality of supporting members 104, defined by thin walls or struts, that extend between the inner sleeve 4 and the outer shell 3 and contributes to an improved rigidity of the bushing. The supporting members 104 are made of the same material as the inner sleeve 4 and the outer shell 3 and generated in the same moulding operation as the latter. The supporting members 104 separate the space between the outer shell 3 and the inner sleeve 4 in a plurality of sub-spaces each of one is filled with said filler 103 from the above end region 5 of the outer shell 3 to the opposite end thereof. Preferably, the supporting members also extend from said end region 5 to the opposite region of the outer shell 3.

In the embodiment of FIG. 1, the wall 7 is one of the walls of an electric power installation such as an electric connection station. The inner space of the station, or container may be filled with a pressurised, electrically insulating gas such as SF6. The inventive device protrudes through the wall 7 and the first end 5 of the outer shell 3 of the insulating part 1 is located outside said inner space of the station or container. The part of the outer shell 3 that protrudes from the frame, including the first end region 5 of the outer shell 3, will form a dividing wall element between the surrounding environment and the inner space of said station, and will also separate the space 102' from communication with the atmosphere outside the container or station.

Figure 3:
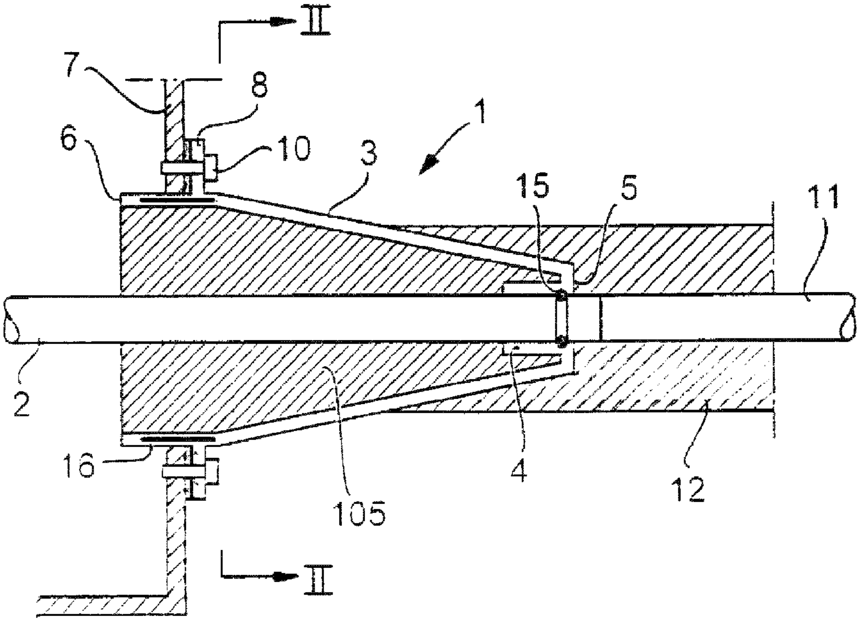
FIG. 3 is a cross-section of a second embodiment of a device according to the invention.

FIG. 3 shows a further embodiment of a bushing according to the invention. In the bushing of FIG. 3, the inner sleeve 4 has a reduced length in the longitudinal direction of the outer shell 3 and extends only a part of the distance from the above-mentioned end region 5 to the opposite end of the outer shell 3. Accordingly, along another part of said distance the filler 105 is in direct contact with the voltage-carrying element 2 which is exposed to the filler 105. Preferably, the filler 105 comprises a material that has a better adherence to the voltage-carrying element 2 than has the thermoplastic sleeve 4, especially when the voltage carrying element 2 is carrying medium or high voltage. Such a better adherence may be referred to the specific material properties of the filler 105. While the thermoplastic resin used for moulding the load-carrying outer shell 3 and inner sleeve 4 may be optimised for its task as a load carrier and electric insulator, the filler 105 may be optimised for its task as an electric insulator and, possibly, for its task as a leakage prevention means that prevents pressurised gas inside the electric connection station or container from leaking out between the thermoplastic insulation part 1 and the voltage-carrying element 2.

In FIGS. 1 and 2, opposite to a first end of the voltage-carrying element 2 there is also shown the mating end of a second contacting part formed by a cable or conductor part of such a cable 11 which is to be electrically connected to the voltage-carrying element 2 of the inventive device in the region of the first end 5 of the outer shell 5. An outer further insulating member 12, normally made of silicon rubber and earthed, has been positioned like a sleeve or sock surrounding the mating ends of the contact 2 part and cable 11, and also surrounding the first end 5 of the insulation part 1 of the electric connection device. The further insulating member 12 fits relatively tightly around the outer periphery of the outer shell 3 of the insulating part 1 of the device. It may be formed by two mating halves that are brought together from opposite sides of the voltage-carrying element 2/outer shell 3, and that are clamped together by means of any outer clamping element (not shown).

Figure 4:
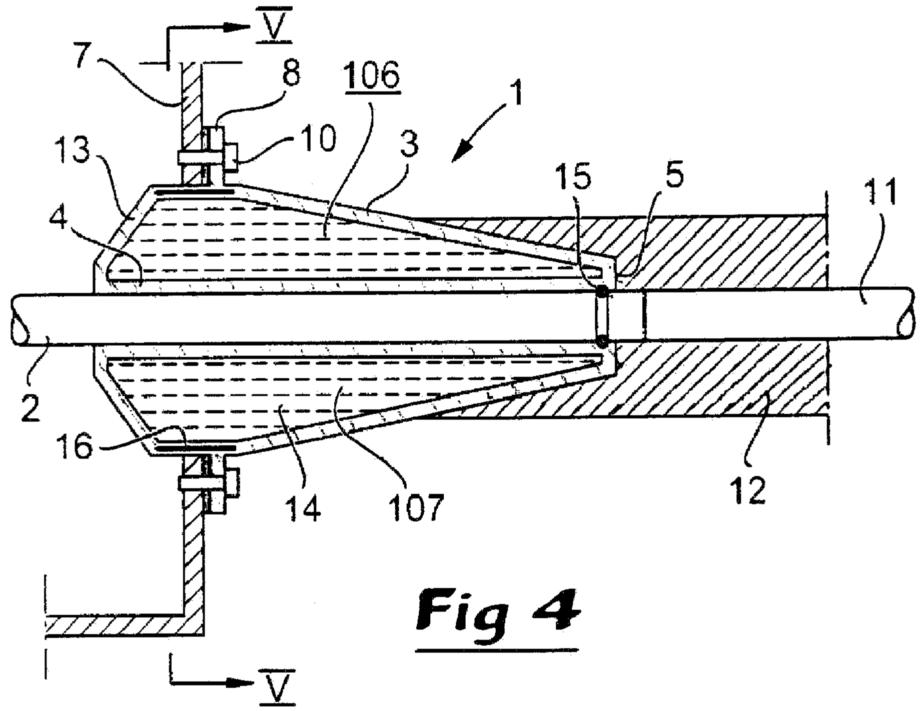
FIG. 4 is a cross-section of a third embodiment of a device according to the invention.

FIG. 4 shows a third embodiment according to which the insulating part 1 also comprises a barrier element 13 which encloses and delimits the space 106 between the voltage-carrying element 2 and the outer shell 3. Here the barrier element 13 comprises the same type of thermoplastic as the insulating part I and is produced in the same moulding processes as the latter. If there is an inner sleeve 4, as in this embodiment, the barrier element 13 is connected to the sleeve 4 and extends from the latter to the surrounding outer shell 3. Preferably, the barrier element 13 is located in the region of a second distal end of the outer shell 3. The space 106 delimited by the voltage-carrying element 2. the outer shell 3 and the barrier element 13 is adjacent to the region of the surrounding frame 7. The space 106 is filled with an electrically insulating filler 107. Said filler may be in a liquid state, and may comprise oil, or may comprise a gel such as a silicone gel. The barrier means may be regarded as a ring-shaped flange extending from the outer shell 3 to the inner sleeve 4 or, in the absence of such a sleeve, to the voltage-carrying element 2 itself, thereby contributing to a sealing and tight enclosure of the space 106 between the voltage-carrying element 2 and the outer shell 3. However, as an alternative when the filler is formed by a solid or semi-solid material, said flange may extend only a part of the distance between outer shell and inner sleeve or contact part, departing from either the outer shell or the inner sleeve/contact part. The geometric shape of the conductor 2, outer shell 3, sleeve 4 and frame 7, as well as the conceived voltages, will, in any case, be decisive for the specific design of the barrier element 13. The barrier element 13 may also be comprised by a first part extending from the contact part/inner sleeve and a second part extending from the outer shell. The barrier element extends in a direction crosswise but not necessarily perpendicular to the longitudinal direction of the voltage-carrying element 2.

Figure 5:
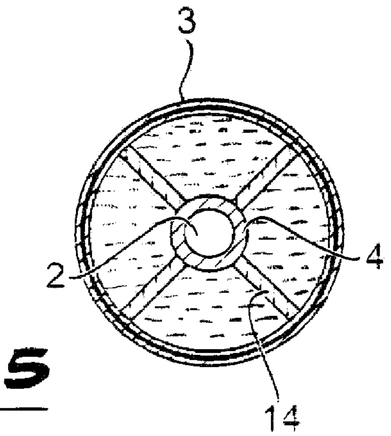
FIG. 5 is a cross-section according to V-V in FIG. 4.

FIG. 5 shows a cross section of one embodiment of the device in accordance with V-V in FIG. 4. In this embodiment the device comprises a further supporting member 14 for supporting the structure of the insulating part 1, thereby contributing to a more rigid structure and a higher mechanical strength of the insulating part 1. Thereby, a more secure holding of the contact part may be achieved. The further supporting member 14 is formed by a plurality of struts or fins extending between the inner sleeve 4 and the outer shell 3. Preferably, the further supporting member 14 comprises the same material as the rest of the insulating part 1 and forms a part thereof. The further supporting member 14 may, preferably, be moulded together with the rest of the insulating part 1 and may, advantageously, form an integrated part thereof. The supporting members 14 divide the space 106 in a plurality of sub-spaces each of which is filled with the filler 107. Even though described as combined with further components such as an inner sleeve 4 and a barrier element 13, the further supporting member 14 might as well be provided in the absence of such further components, then extending between voltage-carrying element 2 and outer shell 3.

According to FIGS. 1, 3 and 4, the device according to the invention is also provided with a sealing ring 15 for preventing any gap, and thus any leakage of e.g. gas, between the insulating part 1 and the voltage-carrying element 2 during operation. The ring 15 is inserted between and in contact with the insulating part 1 and the voltage-carrying element 2, preferably in the region of the first end of the insulating part 1/outer shell 3.

There is also provided a conductive shield 16 in the region of the outer shell 3, the main task of the conductive shield 16 being to suppress the electric field in the region of the connection between outer shell 3 and grounded frame 7 such that the possibility of having a short circuit between voltage-carrying element 2 and frame 7 is further reduced. Here, the conductive shield 16 is a thin sheet of metal, conducting polymer or composite material, of annular shape and embedded in the outer shell 3. However, the shield may, alternatively, be exposed to the spacing between outer shell 3 and voltage-carrying element 2. It may be connected to earth and may, preferably, be used as a voltage indication means for indicating the strength of the electric field.

Figure 6:
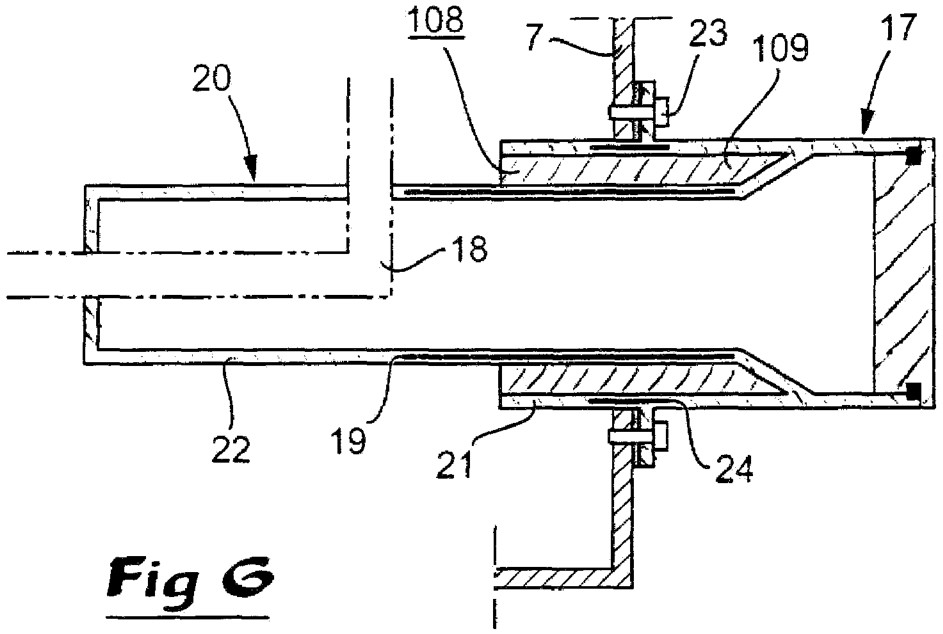
FIG. 6 is a cross-section of a fourth embodiment of the inventive device.
Figure 7:
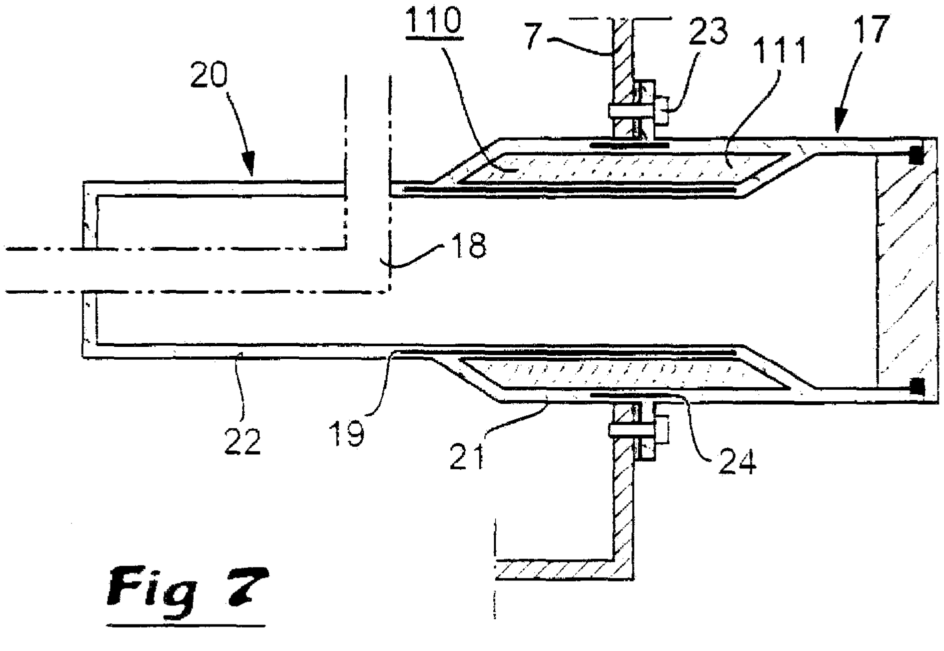
FIG. 7 is a cross-section of a fifth embodiment of the inventive device.

FIGS. 6 and 7 show an embodiment of the inventive device by which the electric insulation part defines a canister 17 for the reception of a fuse. In FIGS. 3 and 4 the fuse has been omitted for the sake of clarity. It should be understood that a fuse is to be inserted into the canister 17 from the right in the figs., and that, when the fuse is in place, an electric conductor 18 will extend through the canister as shown by the dotted line in FIGS. 3 and 4. The conductor 18 passes through the canister wall at a short end thereof opposite to the end from which the ruse is to be inserted. It extends a distance through the interior of the canister 17 and passes through the mantle wall thereof.

The canister 17 is to be connected to a frame or wall element corresponding to the grounded frame 7 described earlier. The connection between frame 7 and canister 17 is beyond the site in which the electric conductor 18 passes through the mantle wall of the canister as seen from the left in FIGS. 3 and 4. The conductor does not pass through the plane of the intersecting frame.

In order to suppress the electric field generated by the conductor 18 in a region inside the canister extending from the region of the conductor 18 to the fuse insertion end of the canister 17, there is provided a shield 19 made of an electrically conducting material embedded in the mantle wall of the canister 17. Said shield 19 may, as here, be made of a thin metal sheet or net of annular shape. The shield 19 extends through the canister wall in the region of the intersection plane between the frame 7 and the canister 17. Accordingly, it protrudes an opening in the grounded frame 7. Moreover, the shield 19 is in electric contact with the conductor 18 by being exposed to a through hole in the mantle wall through which the conductor 18 is to pass (even though not clearly shown in the figs.). During operation, when an intermediate or high voltage is applied to the conductor 18, the shield 19 will adopt the same voltage as the conductor 18.

The canister 17 could be described as being comprised by an electrical insulation part 20 mainly made of a thermoplastic polymer and a voltage carrying element 19 formed by the shield described above. In the intersection region or plane between the frame 7 and the voltage carrying element 19 it is of utmost importance to have satisfying insulation properties in order to prevent any short circuit from appearing between the voltage carrying element 19 and the frame 7. Therefore, the voltage-carrying element 19 is surrounded by an outer shell 21 formed by said insulation part 20, wherein, at least along a part of the length of the voltage-carrying element 19, the outer shell 21 extends with a spacing between its inner periphery and the outer periphery of the voltage-carrying element 19, thereby defining a space 108 therebetween. In particular, the spacing and said space 108 should be provided in the region in which the voltage-carrying element 19 is to protrude through the frame 7, i.e. in the intersection plane between frame 7 and canister 17.

The space 108 is filled with a filler 109 comprising an electrically insulating material other than the thermoplastic resin forming the outer shell 21. The filler may, for example comprise a mouldable elastomer such as poly urethane. As an alternative, the filler may comprise a gel, solid enough to stay in place in said space during use of the canister. The filter 108 completely fills the open space between the outer shell 21 and the voltage-carrying element 19, leaving no air pockets or voids.

The voltage-carrying element 19 may be embedded in or at least be supported by an inner sleeve 22 which is a part of the insulation part 20. Preferably, the inner sleeve 22 defines a tubular body into which a fuse is to be inserted and the interior of which is accessible from outside via the fuse insertion end thereof. The outer shell 21 is connected to the inner sleeve 22, and thereby to the voltage carrying element 19, preferably in the region of the fuse-insertion end of the canister. The outer shell 21 may be provided with any attachment means 23 and a contact surface for the attachment thereof to the frame 7.

The embodiment of FIG. 7 differs from that of FIG. 6 in the same way as the embodiment of FIG. 2 differs from that of FIG. 1, namely by the existence of a barrier element 24 between the outer shell 3 and the voltage-carrying element 19 or inner sleeve 22, enclosing a space 110.

Preferably, likewise to the embodiments of FIGS. 1-5, the space 110 between outer shell 21 and inner sleeve 22 is filled with a solid or liquid filler 111, preferably a liquid filler such as oil, or a gel such as a silicone gel.

The canister 17 of FIGS. 3 and 4 is preferably mounted such that it protrudes the wall of an electric installation like the one described with reference to FIGS. 1-3, the interior of the installation then being to the left of the frame or wall 7 as seen in FIGS. 6 and 7. The interior of the installation may be filled with an insulating gas such as SF6, and, accordingly, it is of utmost importance that the interior of the canister 20 is gas-tightly sealed off from the SF6-containing environment inside said installation. Likewise to the embodiments of FIGS. 1-5, and for the same reasons, the device of FIGS. 3 and 4 is provided with a further shield 24, preferably embedded in the outer shell 21.

It should be remembered that the above description has been by way of example and that alternative embodiments will be obvious for a person skilled in the art, however without departing from the scope of the invention as defined in the annexed claims supported by the description and the annexed drawings.

What is claimed is:

1. A device for electric connection to an energy supply conductor for medium and high voltage, comprising:

a voltage-carrying element, a tubular outer shell formed by a thermoplastic polymer and connected to the voltage-carrying element, wherein the voltage-carrying element extends in a longitudinal direction of said tubular shell, and wherein, at least along a part of the length of the voltage-carrying element, the outer shell extends in said longitudinal direction with a space between its inner periphery and an outer periphery of the voltage-carrying element, said outer shell being provided with an outer contact surface to be connected to a wall of a container somewhere along said part of the length of the voltage-carrying element, wherein said outer shell is arranged to separate said space from an atmosphere outside a container to which said device may be connected, characterised in that, at least along a section of said part of the length of the voltage-carrying element said space is filled with a solid or liquid filler of an electrically insulating material other than that of the outer shell, said filler completely filling said space along said section.

2. The device according to claim 1, characterised in that, in the longitudinal direction of said tubular outer shell, said filler fills said space from a first end region of said space to the region of said contact surface.

3. The device according to claim 1, characterised in that, in the longitudinal direction of said tubular outer shell, said filler fills said space from the region of said contact surface to a second end region of said space.

4. The device according to claim 1, characterised in that said filler has a higher electrical insulating capacity than air, preferably higher than SF6.

5. The device according to claim 1, characterised in that said filler is in a solid state.

6. The device according to claim 5, characterised in that said filler is a filler moulded and permitted to solidify in said space.

7. The device according to claim 1, characterised in that said filler comprises an elastomer.

8. The device according to claim 1, characterised in that said filler comprises polyurethane as a main constituent.

9. The device according to claim 1, characterised in that said filler comprises a gel.

10. The device according to claim 9, characterised in that said gel is a silicone gel.

11. The device according to claim 1 characterised in that said space is a sealed space and that said filler is in a liquid state.

12. The device according to claim 11, characterised in that said filler comprises oil.

13. The device according to claim 1, characterised in that device comprises a bushing, wherein the voltage-carrying element thereof is a conductor extending through said bushing in the longitudinal direction of said outer shell.

14. The device according to claim 13, characterised in that said conductor is exposed to and in contact with said filler.

15. The device according to claim 14, characterised in that said conductor has a modified surface for improved adhesion to said filler in the region in which it contacts said filler.

16. The device according to claim 14, characterised in that there is provided an adhesive agent in the interface between the filler and the conductor that improves the adhesion of the filler to the conductor.

17. The device according to claim 1, characterised in that said device is a fuse canister and that the voltage-carrying element comprises a shield made of an electrically conducting material arranged for the purpose of suppressing an electric field inside the canister.

18. A method of producing a device according to claim 1, characterised in that it comprises the step of filling said space with a filler in a liquid state and permitting the filler to solidify.

19. The method of producing a device according to claim 11, characterised in that it comprises the step of filling said space with a filler in a liquid state and enclosing said space.

20. An electric installation, comprising a container with a wall connected to ground, characterized in that it comprises a device according to claim 1 protruding through and physically connected to said wall.

21. The electric installation according to claim 20, characterised in that said wall extends in a plane cross wise to the longitudinal direction of said tubular outer shell of said device and is connected to said contact surface of said outer shell.

22. The electric installation according to claim 20, characterised in that said container is a gas-tight container in which there is provided an electrically, insulating gas or gas mixture.

* * * * *